(12) United States Patent
Zhang et al.

(10) Patent No.: US 11,566,964 B2
(45) Date of Patent: Jan. 31, 2023

(54) WATER INGRESS DETECTION METHOD AND CIRCUIT, AND ELECTRIC DEVICE

(71) Applicant: Huawei Technologies Co., Ltd., Shenzhen (CN)

(72) Inventors: Hao Zhang, Xi'an (CN); Hao Xia, Shenzhen (CN); Nan Lu, Xi'an (CN); Jun Zhang, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 6 days.

(21) Appl. No.: 17/284,398

(22) PCT Filed: Oct. 10, 2018

(86) PCT No.: PCT/CN2018/109714
§ 371 (c)(1),
(2) Date: Apr. 9, 2021

(87) PCT Pub. No.: WO2020/073253
PCT Pub. Date: Apr. 16, 2020

(65) Prior Publication Data
US 2021/0341351 A1 Nov. 4, 2021

(51) Int. Cl.
*G01M 3/40* (2006.01)
*H01R 13/66* (2006.01)

(52) U.S. Cl.
CPC ........... *G01M 3/40* (2013.01); *H01R 13/6683* (2013.01)

(58) Field of Classification Search
CPC ........ G01M 3/40; G01M 3/16; H01R 13/6683
See application file for complete search history.

(56) References Cited

U.S. PATENT DOCUMENTS

| 10,181,800 B1* | 1/2019 | Nayar | H02J 7/00 |
| 2008/0156090 A1* | 7/2008 | Wehrs | G01M 3/16 |
| | | | 73/290 R |
| 2015/0229119 A1* | 8/2015 | Tao | H02H 1/0007 |
| | | | 361/91.1 |

(Continued)

FOREIGN PATENT DOCUMENTS

| CN | 101614573 B | 12/2009 |
| CN | 101969486 B | 2/2011 |

(Continued)

*Primary Examiner* — Akm Zakaria
(74) *Attorney, Agent, or Firm* — Slater Matsil, LLP (57) ABSTRACT

A circuit includes: a first electrical interface including a first pin, a resistor module, an alternating current signal source, a voltage detection module, and a controller. One end of the resistor module is electrically connected to the first pin. The alternating current signal source is electrically connected to the other end of the resistor module, and configured to generate an alternating current detection signal. The voltage detection module is connected to the first pin, and configured to detect a maximum voltage value and a minimum voltage value that are on the first pin within a period of the alternating current detection signal. The controller is separately connected to the alternating current signal source and the voltage detection module, and configured to, when a difference between the maximum voltage value and the minimum voltage value is less than a first threshold, determine that water enters the first electrical interface.

18 Claims, 6 Drawing Sheets

(56) References Cited

U.S. PATENT DOCUMENTS

| | | | | |
|---|---|---|---|---|
| 2016/0188520 A1* | 6/2016 | Lei | ...................... | G06F 13/4068 |
| | | | | 710/105 |
| 2017/0155263 A1* | 6/2017 | Chen | .......................... | H02J 7/04 |
| 2017/0358922 A1* | 12/2017 | Bacon | ................... | H01R 13/713 |
| 2021/0281084 A1* | 9/2021 | Tang | ..................... | H02J 7/0016 |

FOREIGN PATENT DOCUMENTS

| | | | |
|---|---|---|---|
| CN | 101976770 | B | 2/2011 |
| CN | 201898656 | U | 7/2011 |
| CN | 101945534 | B | 12/2012 |
| CN | 203422132 | U | 2/2014 |
| CN | 203522806 | U | 4/2014 |
| CN | 204360199 | U | 5/2015 |
| CN | 104865297 | A | 8/2015 |
| CN | 205538070 | U | 8/2016 |
| CN | 205719178 | U | 11/2016 |
| CN | 106603760 | A | 4/2017 |
| CN | 206411204 | U | 8/2017 |
| CN | 206627597 | U | 11/2017 |
| CN | 107632915 | A | 1/2018 |
| CN | 105333890 | B | 7/2018 |
| CN | 108366146 | A | 8/2018 |
| CN | 108370170 | A | 8/2018 |
| JP | 2010238467 | B2 | 10/2010 |
| WO | 2018068323 | A1 | 4/2018 |

\* cited by examiner

Circuit 400 when a USB interface is charging, and water enters the USB interface (1) (2)

FIG. 1C
(PRIOR ART)

Circuit 500 when a USB interface is not charging, and water does not enter the USB interface

FIG. 2A

Circuit 600 when a USB interface is charging, and water enters the USB interface

WATER INGRESS DETECTION METHOD AND CIRCUIT, AND ELECTRIC DEVICE

CROSS-REFERENCE TO RELATED APPLICATIONS

This application is a National Stage of International Application No. PCT/CN2018/109714, filed on Oct. 10, 2018, which is hereby incorporated by reference in its entirety.

TECHNICAL FIELD

This application relates to the field of circuit technologies, and in particular, to a water ingress detection method and circuit, and an electronic device.

BACKGROUND

Currently, an electronic device may implement a waterproof function by using a sealed structure. However, the electronic device has some electrical interfaces or components that are exposed outside or that are conditionally exposed, for example, a universal serial bus (USB) interface, a pogo pin, a headset jack, a SIM card interface, and sound channels of a microphone and a speaker.

For such electrical interfaces or components that are exposed outside, there is a high probability of water ingress, for example, water splashed during hand washing and sweat on users' hands. Therefore, water ingress detection needs to be performed on such electrical interfaces or components that are exposed outside, and a corresponding protection measure is taken after water ingress is detected.

In the prior art, the detection may be performed by using a photoelectric water sensor or by using a float liquid level detection method. However, in both detection methods, water ingress can only be detected when a to-be-detected electrical interface or component is completely immersed in water. In addition, in most cases, the electrical interface is not completely immersed in water, but is splashed with a small amount of water, or is flowed into a small amount of sweat. These common cases of ingress of a small amount of water cannot be detected by using the two existing detection methods.

SUMMARY

According to a water ingress detection method and circuit, and an electronic device provided in this application, whether a small amount of water enters an electrical interface can be detected. When the electrical interface is in a charging state, whether a small amount of water enters the electrical device can also be detected. This helps improve accuracy of detecting water ingress of the electrical interface.

According to a first aspect, this application provides a water ingress detection method, which may be applied to an electronic device including a first electrical interface, a resistor module, and an alternating current signal source. One end of the resistor module is electrically connected to a first pin of the first electrical interface, and the other end is electrically connected to the alternating current signal source, and a ground pin of the first electrical interface is grounded when the first electrical interface works. The method includes:

The alternating current signal source of the electronic device outputs an alternating current detection signal. The electronic device detects a maximum voltage value and a minimum voltage value that are on the first pin within a period of the alternating current detection signal. If a difference between the maximum voltage value and the minimum voltage value is less than a first threshold, the electronic device determines that water enters the first electrical interface.

Therefore, when the electrical interface of the electronic device is in a charging state or a non-charging state, whether water enters the electronic device can be accurately detected. In addition, when a small amount of water enters the electrical interface of the electronic device, that water enters the electrical interface of the electronic device may also be detected. It can be learned that the detection method provided in this embodiment of this application can improve accuracy of detecting water ingress of the electronic device. In addition, costs of components used in the resistor module, the alternating current signal source, and the voltage detection circuit in the method provided in the embodiments of this application are relatively low.

In a possible implementation, a total resistance value of the resistance module is greater than 100 kilo ohms, and a frequency of the alternating current detection signal is between 10 Hz and 50 Hz.

In a possible implementation, that the alternating current signal source of the electronic device outputs an alternating current detection signal includes: when it is detected that the first electrical interface is in a charging state, the electronic device controls the alternating current signal source to output the alternating current detection signal; or in response to a detected operation of enabling a detection function by a user, the electronic device controls the alternating current signal source to output the alternating current detection signal; or when it is detected that the electronic device is in a power-on state, the electronic device controls the alternating current signal source to output the alternating current detection signal.

According to a second aspect, an electrical interface water ingress detection circuit is provided. The circuit includes: a first electrical interface, where the first electrical interface includes a ground pin, configured to be grounded when the first electrical interface works, and a first pin; a resistor module, one end of the resistor module is electrically connected to the first pin; an alternating current signal source, electrically connected to the other end of the resistor module, and configured to generate an alternating current detection signal; a voltage detection module, connected to the first pin, and configured to detect a maximum voltage value and a minimum voltage value that are on the first pin within a period of the alternating current detection signal; and a controller, separately connected to the alternating current signal source and the voltage detection module, and configured to control the alternating current signal source to generate the alternating current detection signal, and when a difference between the maximum voltage value and the minimum voltage value is less than a first threshold, determine that water enters the first electrical interface.

In a possible implementation, the first electrical interface further includes a power supply pin, configured to connect to a working power supply when the first electrical interface works.

In a possible implementation, the first electrical interface is a universal serial bus USB interface.

In a possible implementation, the first interface is an ID pin.

In a possible implementation, the voltage detection module is an analog-to-digital converter.

In a possible implementation, the controller is a processor.

According to a third aspect, an electronic device is provided. The electronic device includes: a processor, a memory, a first electrical interface, a resistor module, and an alternating current signal source, where one end of the resistor module is electrically connected to a first pin of the first electrical interface, and the other end is electrically connected to the alternating current signal source, a ground pin of the first electrical interface is grounded when the first electrical interface works, the alternating current signal source is connected to the processor, the processor is coupled to the memory, the memory is configured to store computer program code, the computer program code includes a computer instruction, and when the processor reads the computer instruction from the memory, a terminal performs the electrical interface water ingress detection method according to any one of the first aspect or the possible implementations of the first aspect.

According to a fourth aspect, an electronic device is provided. The electronic device includes the electrical interface water ingress detection circuit according to any one of the second aspect or the possible implementations of the second aspect.

DETAILED DESCRIPTION OF ILLUSTRATIVE EMBODIMENTS

Figure 1A:
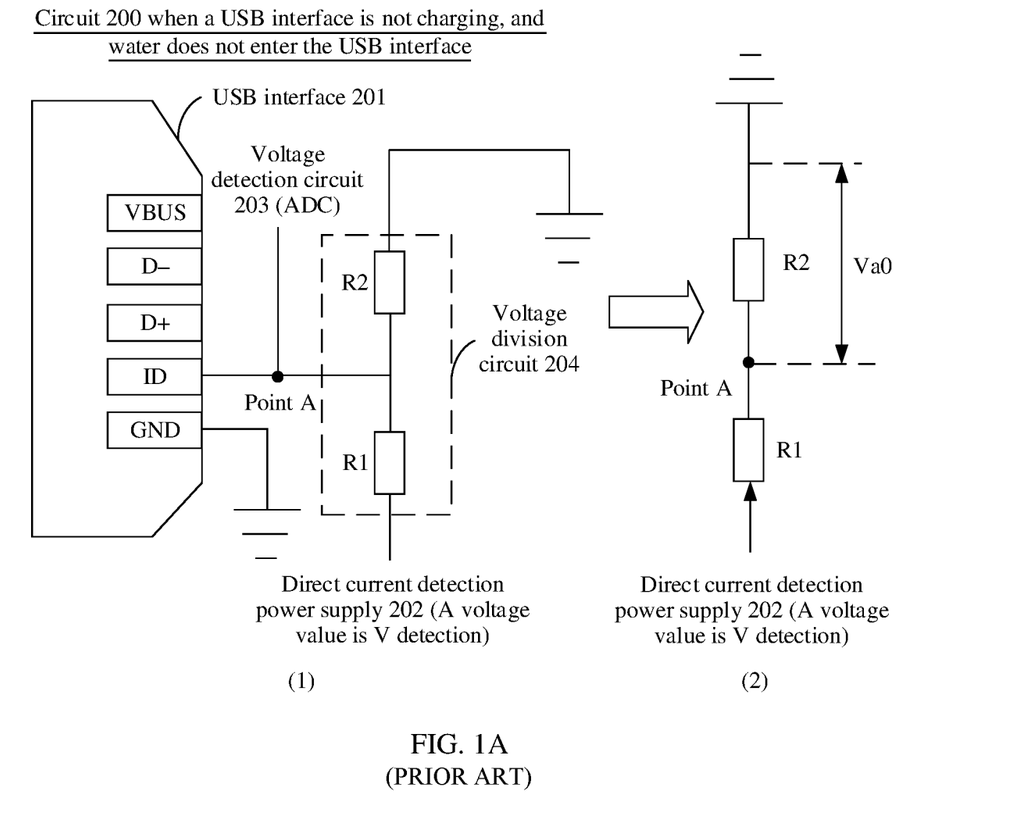
FIG. 1A is a diagram 1 of a circuit for detecting whether water enters a USB interface in the prior art.

FIG. 1A (1) is a circuit 200 for detecting whether water enters a USB interface in the prior art. The circuit 200 may include a USB interface 201, a direct current detection power supply 202, and a voltage detection circuit 203, for example, may be an analog-to-digital converter (ADC) and a voltage division circuit 204.

The USB interface 201 may be disposed on a mainboard of an electronic device. The USB interface 201 may charge the electronic device and/or be a USB data transmission interface connector. The USB interface 201 may include a power supply pin (VBUS), a data pin (D− and D+), an ID pin (used to identify endpoints of different cables), and a ground pin (GND). These pins may be integrated on a same chip, and the chip may be fixed on a housing of a USB socket. The power supply pin may be configured to connect to a power supply for working of the USB interface, for example, a 5 V direct current power supply. The data pin is configured to receive/send a signal transmitted through a USB data cable. The ID pin may be configured to implement data transmission between devices when there is no host (Host). The ground pin is equivalent to the negative electrode of the power supply.

The USB interface 201 is separately connected to the voltage detection circuit 203 and the voltage division circuit 204 by using the ID pin. The voltage division circuit 204 includes a resistor R1 and a resistor R2 that are connected in series. One end of the resistor R1 and one end of the resistor R2 are both connected to the ID pin. The other end of the resistor R1 in the voltage division circuit 204 is connected to the direct current detection current 202, and the other end of the resistor R2 is grounded. The voltage detection circuit 203 is configured to detect a voltage value on the ID pin to ground (which may be referred to as a voltage value on the ID pin for short). Optionally, in this circuit, the voltage detection circuit 203 may also be replaced with a current detection circuit, and the current detection circuit is configured to detect a value of a current flowing through the ID pin.

In the prior art, whether water enters the USB interface may be determined by detecting whether the voltage value (or the value of the current flowing through the ID pin) on the ID pin changes. If it is detected that the voltage value (or the value of the current flowing through the ID pin) on the ID pin changes, it may be considered that water enters the USB interface. The following uses an example in which the voltage value on the ID pin is detected for description.

When the USB interface is in a non-charging state (in other words, the VBUS pin is not connected to a working power supply) and water does not enter the USB, it can be detected that the voltage value on the ID pin is a fixed value.

Reasons are as follows. FIG. 1A (2) shows an equivalent circuit diagram of the circuit 200. According to the circuit diagram, the voltage detection circuit 203 detects that the voltage value on the ID pin is a voltage division value of a voltage value of the direct current detection power supply 202 on R2. Because the voltage value of the direct current detection power supply 202 and resistance values of voltage divider resistors (R1 and R2) are constant, it is detected that the voltage value on the ID pin is also a fixed value. Specifically, a voltage on the ID pin (point A) when the USB interface is not charging and water does not enter the USB interface is Va0=V detection/(1+R1/R2). V detection is a voltage value output by the direct current detection power supply 202. Because the values of V detection, R1, and R2 are all fixed values, Va0 is a fixed value. If the USB interface is still in a non-charging state but water enters the USB interface, it may be detected that the voltage value on the ID pin is no longer the foregoing fixed value, but changes.

Figure 1B:
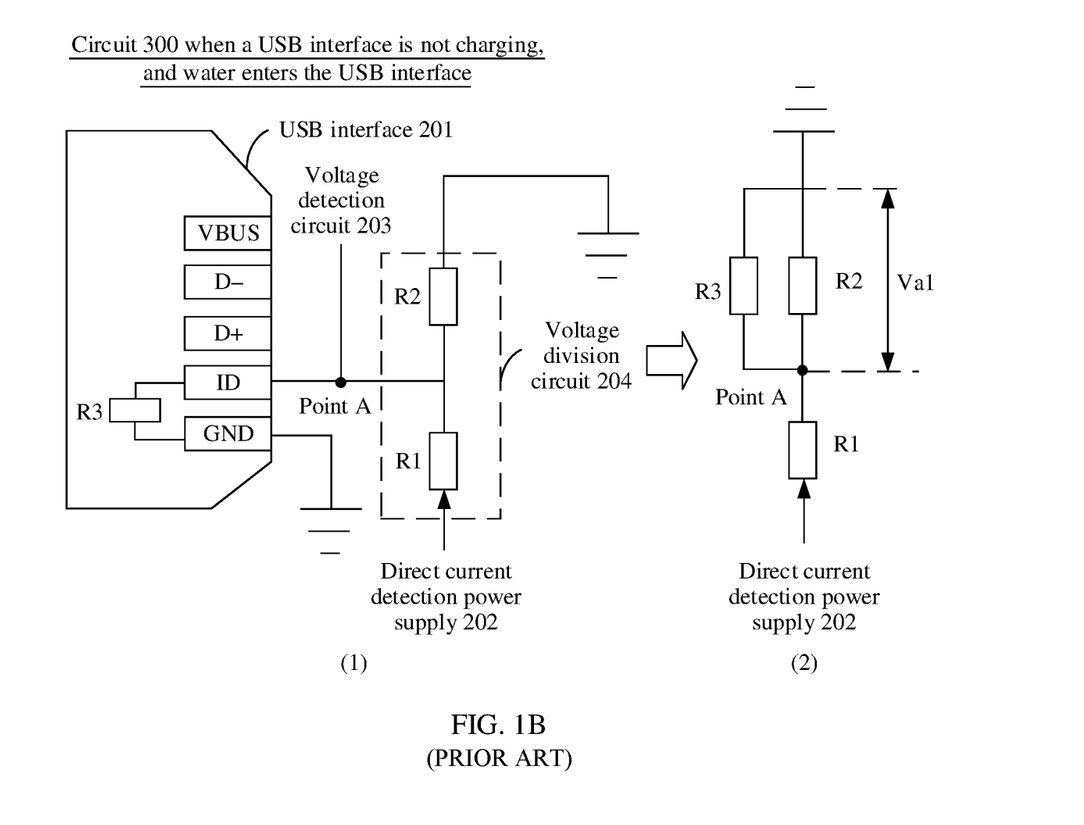
FIG. 1B is a diagram 2 of a circuit for detecting whether water enters a USB interface in the prior art.

Reasons are as follows. FIG. 1B (1) shows a circuit diagram 300 formed after water enters the USB interface when the USB interface is in a charging state. In the circuit diagram 300, an equivalent resistor R3 is an equivalent resistor formed by water between the ID pin and the GND pin. FIG. 1B (2) shows an equivalent circuit diagram of the circuit 300. It can be known from the equivalent circuit diagram that, the equivalent resistor R3 is equivalent to being connected in parallel with the resistor R2, and then connected in series with the resistor R1. In this case, the voltage value on the ID pin should be a division voltage value after R2 and R3 are connected in parallel. Compared with a case in which water does not enter the USB interface, because a resistance value after R2 and R3 are connected in parallel is different from a resistance value of R2 in the circuit 200, a detected voltage value on the ID pin changes.

Specifically, a voltage on the ID pin (point A) when the USB interface is not charging and water does not enter the USB interface is Va1=V detection/(1+R1/R2+R1/R3). Compared Va1 with Va0, a denominator of Va1 increases, which is obviously less than Va0. Therefore, whether water enters the USB interface can be determined by detecting the voltage change on the ID pin.

Figure 1C:
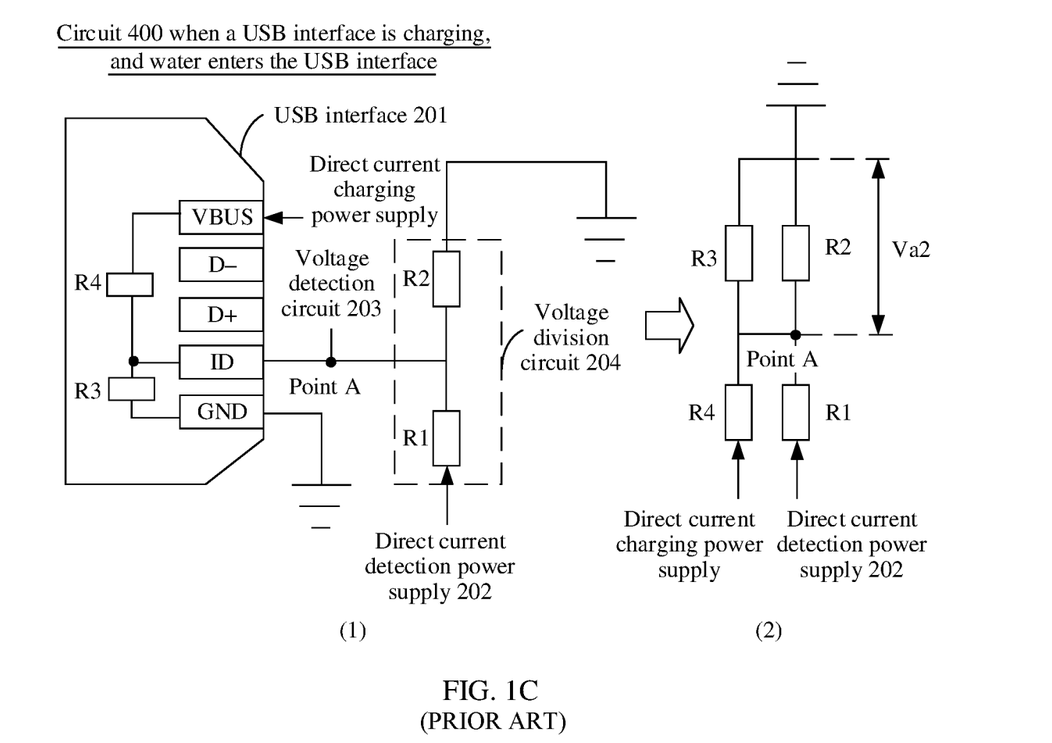
FIG. 1C is a diagram 3 of a circuit for detecting whether water enters a USB interface in the prior art.

It should be noted that a method of the circuit 200 may be used to determine whether water enters the USB interface only when the USB interface is in a non-charging state. When the USB interface is in a charging state, whether water enters the USB interface may be inaccurately detected by using this method. Reasons are as follows:

FIG. 1C (i) is a circuit diagram 400 formed after water enters the USB interface when the USB interface is in a charging state. In the circuit diagram 400, an equivalent resistor R3 is formed by water between the ID pin and the GND pin, and an equivalent resistor R4 is formed by water between the VBUS pin and the ID pin. In this case, the VBUS pin is connected to a direct current charging power supply when the USB interface is charging (a voltage value is recorded as Vbus).

FIG. 1C (2) shows an equivalent circuit diagram of the circuit 400. It can be learned from the equivalent circuit diagram that, compared with the circuit shown in FIG. 1A (2) when the USB interface is not charging and water does not enter the USB interface, both the equivalent resistor R3 and the equivalent resistor R4 that are formed after water enters the USB have impact on the voltage value on the ID pin. 1. Impact of the equivalent resistor R4 and the direct current charging power supply input by the VBUS pin are not considered. Because a total resistance value decreases after R3 and R2 are connected in parallel, a division voltage value decreases. In other words, the detected voltage value on the ID pin decreases. 2. Impact of the equivalent resistor R3 is not considered. Because the direct current charging power supply input by the VBUS pin inputs a current into the voltage division circuit through the equivalent resistor R4, the voltage value on the ID pin increases. To sum up, the impact of the equivalent resistor R3 and the impact of the equivalent resistor R4 on the voltage value on the ID pin is as follows: One resistor increases the voltage value on the ID pin, and the other resistor decreases the voltage value on the ID pin. In addition, whether water enters the USB interface is random, water volume is uncertain, and a constituent of entered water is uncertain (a conductivity is uncertain), which cause resistance values of the equivalent resistor R3 and the equivalent resistor R4 to be uncertain. Moreover, it is difficult to determine the impact of the equivalent resistor R3 and the impact of the equivalent resistor R4 on the voltage value on the ID pin. In other words, when the USB interface is in a charging state, if water enters the USB interface, the voltage value on the ID pin may also be enabled to be equal to the foregoing fixed value under joint impact of the equivalent resistor R3, the equivalent resistor R4, and the direct current power supply connected to the VBUS pin, or is within a normal fluctuation range of the foregoing fixed value. In other words, in the detection method in the prior art, whether water enters the USB interface may not be detected.

Specifically, a voltage value on the ID pin (point A) when the USB interface is charging and water enters the USB interface is Va2=V detection/(1+R1/R2+R1/R3+R1/R4)+ Vbus/(1+R4/R1+R4/R2+R4/R3).

It can be known from comparison between Va2 and Va0 that, compared Va2 with Va0, a denominator of V detection/ (1+R1/R2+R1/R3+R1/R4) is increased by R1/R3+R1/R4, and a value is less than Va0. However, compared with Va0, Va2 has an additional voltage of Vbus/(1+R4/R1+R4/R2+ R4/R3). Therefore, compared Va2 with Va0, two values may be the same, may be slightly different (a difference is within a normal detection error range), or may be greatly different. Therefore, it is impossible to detect whether water enters the USB interface when the USB interface is charging.

The technical solutions provided in the embodiments of this application may be used to detect whether water enters an electrical interface or a component, of the electronic device, that is exposed outside. Regardless of whether the detected electrical interface or component is in a charging state, or whether the detected electrical interface or component has a pin with a constant voltage, whether water enters the detected electrical interface or component can be accurately detected. The electrical interface or component, of the electronic device, that is exposed outside includes but is not limited to: a USB interface, a pogo pin, a headset jack, a SIM card interface, sound channels of a microphone and a speaker, and the like. The technical solutions provided in the embodiments of this application may further be used to perform water ingress detection on a specific position of an internal module or a surface of the electronic device. A to-be-detected object, a to-be-detected position, and the like in the electronic device are not limited in this embodiment of this application.

The following uses an example in which the technical solutions provided in the embodiments of this application are applied to detect whether water enters the USB interface for description.

Figure 2A:
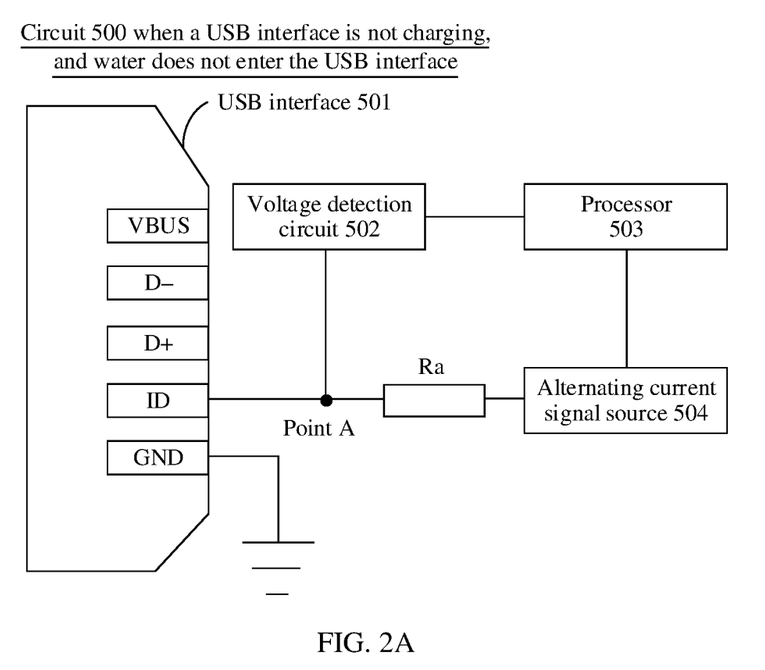
FIG. 2A is a diagram 1 of a circuit for detecting whether water enters a USB interface according to an embodiment of this application.

FIG. 2A is a circuit 500 for detecting whether water enters a USB interface according to an embodiment of this application. The circuit 500 includes a USB interface 501, a voltage detection circuit 502 (which may be, for example, an ADC), a processor 503, an alternating current signal source 504, and a resistor module (which may include one or more resistors that may be equivalent to a resistor Ra, which is briefly denoted as the resistor Ra in the following).

Functions of the USB interface 501 and the voltage detection circuit 502 are respectively similar to those of the USB 201 and the voltage detection circuit 203 in the circuit 200 shown in FIG. 1A (i). Details are not described again.

It should further be noted that, in this application, a model of the USB interface 501 and quantities of power supply pins and GND pins included in the USB interface 501 are not limited. In addition to the pins shown in FIG. 2A, the USB interface 501 may further include another pin.

A first pin of the USB interface 501 is separately connected to one end of the resistor Ra and an input end of the voltage detection circuit 502. The first pin may be any idle pin in the USB interface 501, for example, an ID pin. The following uses an example in which the first pin is the ID pin for description.

The other end of the resistor Ra is connected to the alternating current signal source 504. A resistance value of the resistor Ra is usually set to be far greater than a resistance value of an equivalent resistor when water enters the USB interface. The resistance value of the equivalent resistor when water enters the USB interface may be used to determine a rough range of resistance values of the equivalent resistor through a large quantity of experiments and by considering many factors such as a constituent of entered water, a volume of entered water, and a position of water ingress. Then, the resistance value of the resistor Ra is determined based on the resistance values in the range. A method for determining the resistance value of the resistor Ra is not limited in this embodiment of this application. For example, if the equivalent resistor is usually at a 1 Kohm (ohm) level, the resistance value of Ra may be set to a hundreds-of-Kohms level.

An input end of the voltage detection circuit 502 is connected to the ID pin, and is configured to detect a voltage value on the ID pin to ground (which may be referred to as a voltage value on the ID pin for short). An output end of the voltage detection circuit 502 is connected to the processor 503, and is configured to output the detected voltage value to the processor. In this embodiment of this application, an alternating current power signal is used as a detection signal. Therefore, the voltage value on the ID pin also changes periodically. The voltage detection circuit 502 is configured to detect a maximum value and a minimum value of voltage values on the ID pin in one or more periods, and deliver each detected voltage value to the processor 503 for processing.

The processor 503 may be a central processing unit (CPU), or an application specific integrated circuit (ASIC), or may be configured as one or more integrated circuits for implementing this embodiment of this application, for example, one or more digital signal processors (DSP) or one or more field programmable gate arrays (FPGA). The processor 503 is separately connected to the alternating current signal source 504 and the voltage detection circuit 502.

The processor 503 may be configured to control, by using, for example, a general purpose input/output (GPIO) interface, the alternating current signal source 504 to output an alternating current signal, and the alternating current signal is used as a detection signal for detecting whether water enters the USB interface 501. The alternating current signal output by the alternating current signal source 504 may be, for example, in a square wave, a sine wave, or a triangular wave. A frequency of the alternating current signal needs to be determined based on the resistor Ra and a capacitance value of an equivalent capacitor when water enters the USB interface. For a determining principle, refer to the following description of the principle of the detection method. Details are not described herein again. The capacitor value of the equivalent capacitor when water enters the USB interface may be used to determine a rough range of capacitor values of the equivalent capacitor through a large quantity of experiments and by considering many factors such as a constituent of entered water, a volume of entered water, and a position of water ingress. Then, a frequency range of an alternating current detection signal is determined based on the capacitance values in the range. For example, a frequency value of the alternating current detection signal may be 10 Hz to 50 Hz.

Optionally, when it is detected that the electronic device is powered on, the processor 503 may control the alternating current signal source 504 to output an alternating current signal. Alternatively, when it is detected that the USB interface is in a charging state, the processor 503 may control the alternating current signal source 504 to output an alternating current signal. Alternatively, after it is detected that a user enables an operation of detecting whether water enters the USB interface, the processor 503 may further control the alternating current signal source 504 to output an alternating current signal. This is not limited in this embodiment of this application.

The processor 503 may further be configured to calculate, based on a voltage value collected by the voltage detection circuit 502, a peak-to-peak value of the voltage value detected by the voltage detection circuit 502 (namely, a difference between the maximum value and the minimum value of the voltage values on the ID pin in one or more periods), to determine whether water enters the USB interface 201. Specifically, if a change of the peak-to-peak value of the voltage value detected by the voltage detection circuit 502 is greater than a threshold, it is considered that water enters the USB interface. Otherwise, water does not enter the USB interface. When calculation is performed on the peak-to-peak value of the detected voltage value, a difference between a maximum value and a minimum value of the detected voltage value in each period may be obtained, and an average value of the obtained differences is determined as the peak-to-peak value. Alternatively, a maximum value and a minimum value of voltage values in each period may be averaged respectively, and then a difference between an average value of the maximum values and an average value of the minimum values is calculated to obtain the peak-to-peak value. A specific calculation method of the peak-to-peak value is not limited in this embodiment of this application.

The processor 503 may further be configured to: after it is determined that water enters the USB interface 501, trigger a corresponding protection measure of the electronic device, for example, prompt a user that water enters the USB interface, or use a measure such as power-off protection.

The following describes a principle of the detection method provided in the embodiments of this application.

In a first scenario, when the USB interface is in a charging state, whether water enters the USB interface is detected.

When the USB interface is in a non-charging state and water does not enter the USB interface, the circuit 500 shown in FIG. 2A is used. An alternating current detection signal output by the alternating current signal source 504 in the circuit 500 is connected to the ID pin by using the resistor Ra. In this case, the detected voltage value on the ID pin may be approximately a voltage value of an alternating current detection power supply. Therefore, the peak-to-peak value of the voltage value on the ID pin is also approximately a peak-to-peak value of the voltage value of the alternating current detection signal, and may be used as a comparison reference, namely, a basis for setting a threshold.

It should be noted that, when water does not enter the USB interface, materials such as air and plastic are filled between pins of the USB interface. After water enters the USB interface, water is filled between the pins of the USB interface. In addition, a dielectric constant of water is higher than a dielectric constant of a substance such as air or plastic, and the dielectric constant is in direct proportion to a capacitance value. Therefore, water between the pins of the USB interface not only forms an equivalent resistor, but also forms an equivalent capacitor.

Figure 2B:
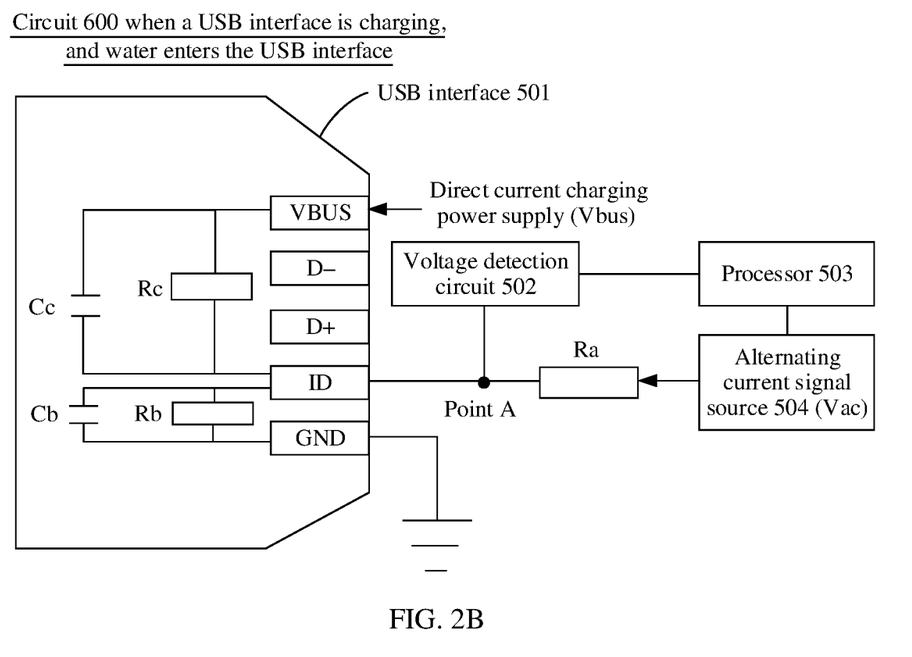
FIG. 2B is a diagram 2 of a circuit for detecting whether water enters a USB interface according to an embodiment of this application.

FIG. 2B shows a circuit 600 when a USB interface is in a charging state and water enters the USB interface according to an embodiment of this application. In the circuit 600, an equivalent resistor Rb and an equivalent capacitor Cb are formed by water between the ID pin and the GND pin. An equivalent resistor Rc and an equivalent capacitor Cc are formed by water between the ID pin and the VBUS pin. The VBUS pin inputs a direct current power signal.

Because water enters the USB interface has different constituents, different volumes, and different electrical conductivities, resistance values of the formed equivalent resistors are also different, and further impact on the circuit 600 is different. Therefore, different cases need to be considered as follows:

In a first case, water entering the USB interface has a relatively strong conductivity.

Figure 2C:
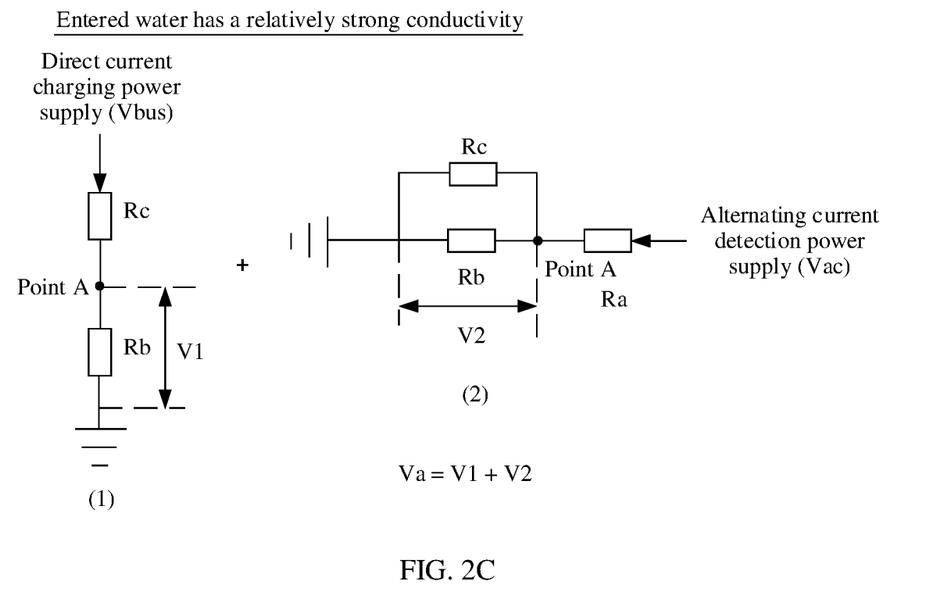
FIG. 2C is a diagram 3 of a circuit for detecting whether water enters a USB interface according to an embodiment of this application.

The circuit 600 includes two types of power supply signals: a direct current charging signal and an alternating current detection signal. The two types of power supply signals are considered separately. For the direct current charging signal (whose voltage value is denoted as Vbus), because a capacitor has a physical characteristic of supporting an alternating current circuit while obstructing a direct current circuit, equivalent capacitors Cc and Cb do not affect the direct current charging signal. It is equivalent to that a direct current charging power supply is directly grounded by using two equivalent resistors Rc and Rb that are connected in series, as shown in FIG. 2C (1). Apparently, in this case, a direct current voltage value on the ID pin is a voltage division value (denoted as V1 and equal to Vbus×Rb/(Rb+Rc)) of the direct current charging power supply on Rb. Because resistance values of the equivalent resistor Rc and the equivalent resistor Rb randomly change with a volume and a constituent of water entered the USB interface, a value of V1 varies with a water ingress status. However, in a same water ingress status, V1 remains unchanged, and therefore the peak-to-peak value of the voltage on the ID pin is not affected.

For the alternating current detection signal (whose voltage value is denoted as Vac), the VBUS pin is equivalent to be grounded (this is because the VBUS pin provides the direct current power signal, and the alternating current signal is zero or extremely small, which may be equivalent to be grounded). In addition, when water entering the USB interface has a relatively strong conductivity, a resistance value of the equivalent resistor formed between the pins in the USB interface is extremely small, and is generally far less than a capacitive reactance value of the equivalent capacitor formed between the pins (that is, far greater than the capacitance value of the equivalent capacitor). Therefore, impact of the equivalent resistor on the circuit 600 is extremely great, and impact of the equivalent capacitor on the circuit 600 may be ignored. In this case, the alternating current detection power supply is equivalent to be grounded after being connected to a parallel resistor (a resistor obtained after the equivalent resistor Rc and the equivalent resistor Rb are connected in parallel) in series by using the resistor Ra, as shown in FIG. 2C (2). When water entering the USB interface has a relatively strong conductivity, resistance values of the equivalent resistor Rb and the equivalent resistor Rc are very small, and are far less than that of the resistor Ra. In this case, an alternating current voltage value (denoted as V2 and equal to Vac/(1+Ra/Rb+Ra/Rb)) on the ID pin is extremely small, that is, an amplitude of V2 (a maximum absolute value of an instantaneous alternating current in one period) is extremely small, and therefore a peak-to-peak value of V2 is also extremely small.

For example, it is assumed that the direct current charging power supply of the USB interface is 5 V, and the alternating current detection power supply is from 1.8 V to −1.8 V. The resistance value of the resistor Ra is 200 Kohm, and the resistance values of the equivalent resistors Rb and Rc are both 1 Kohm.

When water does not enter the USB interface, the VBUS pin and the ID pin are disconnected, and the direct current charging power supply does not affect a voltage on the ID pin. In this case, a peak-peak value of the voltage on the ID pin is 1.8 V−(−1.8 V)=3.6 V.

After water enters the USB interface, the VBUS pin and the ID pin are connected by using the equivalent resistors Rb and Rc formed by water.

When a maximum voltage of the alternating current detection power supply is 1.8 V, a total resistance after the equivalent resistors Rb and Rc are connected in parallel is 0.5 Kohm. In this case, V2=1.8V×0.5 Kohm/(0.5 Kohm+200 Kohm) is approximately equal to 0.0045 V.

In this case, V1=5V×1 Kohm/(1 Kohm+1 Kohm)=2.5V.

Therefore, the detected voltage on the ID pin is Va=V1+V2=2.5045 V.

When a minimum voltage of the alternating current detection power supply is −1.8V, a total resistance after the equivalent resistors Rb and Rc are connected in parallel is 0.5 Kohm. In this case, V2=−1.8V×0.5 Kohm/(0.5 Kohm+200 Kohm) is approximately equal to −0.0045 V.

In this case, V1=5V×1 Kohm/(1 Kohm+1 Kohm)=2.5V.

Therefore, the detected voltage on the ID pin is Va'=V1+V2=2.4955V.

It can be learned that a peak-to-peak value of the detected voltage on the ID pin is Va−Va'=0.009 V, which is far less than the peak-to-peak value (3.6 V) obtained when water does not enter the USB interface.

In conclusion, the voltage on the ID pin should be a sum of V1 and V2. V1 is a stable voltage, and V2 fluctuates, but an amplitude is very small. In other words, compared with a case in which water does not enter the USB interface, a peak-to-peak value of the voltage value that is on the ID pin and that is detected by the voltage detection circuit is also extremely small. Therefore, whether water enters the USB interface can be determined by detecting a change of the peak-to-peak value of the voltage value on the ID pin.

In a second case, water entering the USB interface has a relatively poor conductivity.

When water enters the USB interface has a relatively poor conductivity, an equivalent resistance value between pins of USB interface may be considered as infinite. In addition, because a capacitor has a physical characteristic of supporting an alternating current circuit while obstructing a direct current circuit, a direct current charging power supply is equivalent to be grounded by connecting two infinite equivalent resistors in series. Two among the VBUS pin, the ID pin, and GND pin are equivalent to be in an open-circuited state. In this case, the direct current charging power supply on the VBUS pin does not affect a voltage on the ID pin.

Figure 2D:
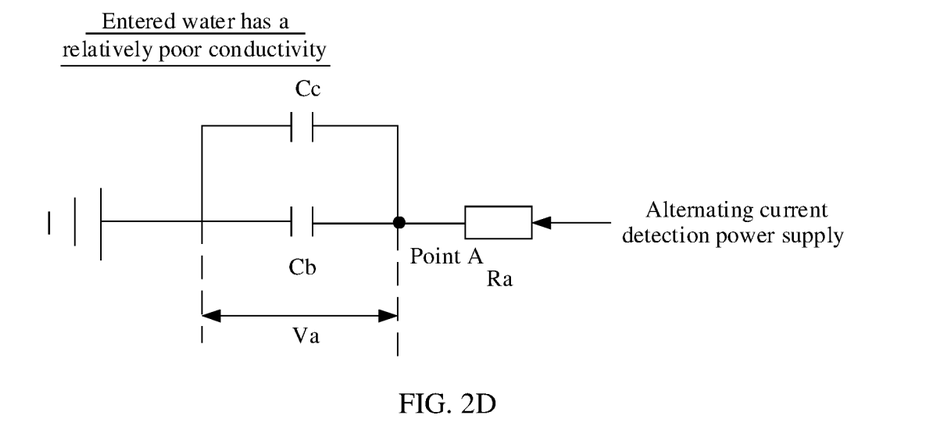
FIG. 2D is a diagram 4 of a circuit for detecting whether water enters a USB interface according to an embodiment of this application.

For an alternating current detection signal (whose voltage value is denoted as Vac), the VBUS is equivalent to be grounded. In this case, the alternating current detection power supply is equivalent to be grounded after being connected to a parallel capacitor (a capacitor obtained after the equivalent capacitor Cc and the equivalent capacitor Cb are connected in parallel) in series by using the resistor Ra, as shown in FIG. 2D. In this case, the resistor Ra and the parallel capacitor form a low-pass filter (low pass filtering). The voltage on the ID pin (point A) is an output voltage of the low-pass filter.

$$Va = \frac{1}{\sqrt{1+(2\pi f \times Ra \times C)^2}} \times Vac$$

f is a frequency of the alternating current detection power supply, and C is the capacitor obtained after the equivalent capacitor Cc and the equivalent capacitor Cb are connected in parallel.

It can be learned from the foregoing formula that a higher frequency of the alternating current detection power supply indicates a larger amplitude attenuation of an output voltage Va of the alternating current detection power supply.

In addition, using the low-pass filter is a filtering manner. A rule is that a low-frequency signal can normally pass, and a high-frequency signal that exceeds a specified critical value is blocked and weakened. The critical value may also be referred to as a cut-off frequency, and a calculation formula of the cut-off frequency is as follows.

$$fc = \frac{1}{2\pi \times Ra \times C}$$

At this cut-off frequency, an amplitude of the alternating current power supply attenuates by 3 dB. After the cut-off frequency, an amplitude of the alternating current power supply passing through this circuit decreases rapidly with an increase of the frequency of the alternating current power supply.

Due to amplitude attenuation, a peak-to-peak value of the voltage detected by the voltage detection circuit on the ID pin also attenuates. In other words, after water ingress, the peak-to-peak value of the voltage on the ID pin decreases from twice amplitude before water ingress to a smaller voltage value. Therefore, whether water enters the USB interface can be detected by detecting a change of the peak-to-peak value of the voltage on the ID pin.

It should further be noted that, when water does not enter the USB interface, materials such as air and plastic are filled between the pins of the USB interface, and these materials may also form an equivalent capacitor. In this case, a cut-off frequency of the low-pass filter is recorded as F1. After water enters the USB interface, water is filled between the pins of the USB interface. In addition, a dielectric constant of water is higher than a dielectric constant of a substance such as air or plastic, and the dielectric constant is in direct proportion to a capacitance value. A capacitance value of the equivalent capacitor after water ingress becomes larger. Because the cutoff frequency is inversely proportional to the capacitance value, in other words, a cut-off frequency (denoted as F2) after water ingress becomes smaller, that is, F1>F2.

If a frequency of the alternating current signal output by the alternating current signal source 504 is between F1 and F2, when water does not enter the USB interface, an amplitude of the alternating current signal basically does not change after the alternating current signal passes through the low-pass filter. However, after water enters the USB interface, an amplitude of the alternating current signal is greatly decreased after the alternating current signal passes through the low-pass filter, and the peak-to-peak value is also greatly decreased. In other words, the frequency of the alternating current signal output by the alternating current signal source 504 may be controlled to be between F1 and F2, and then whether water enters the USB interface is determined by detecting a change of the peak-to-peak value of the voltage value on the ID pin.

In a second scenario, when the USB interface is in a non-charging state, whether water enters the USB interface is detected.

Figure 2E:
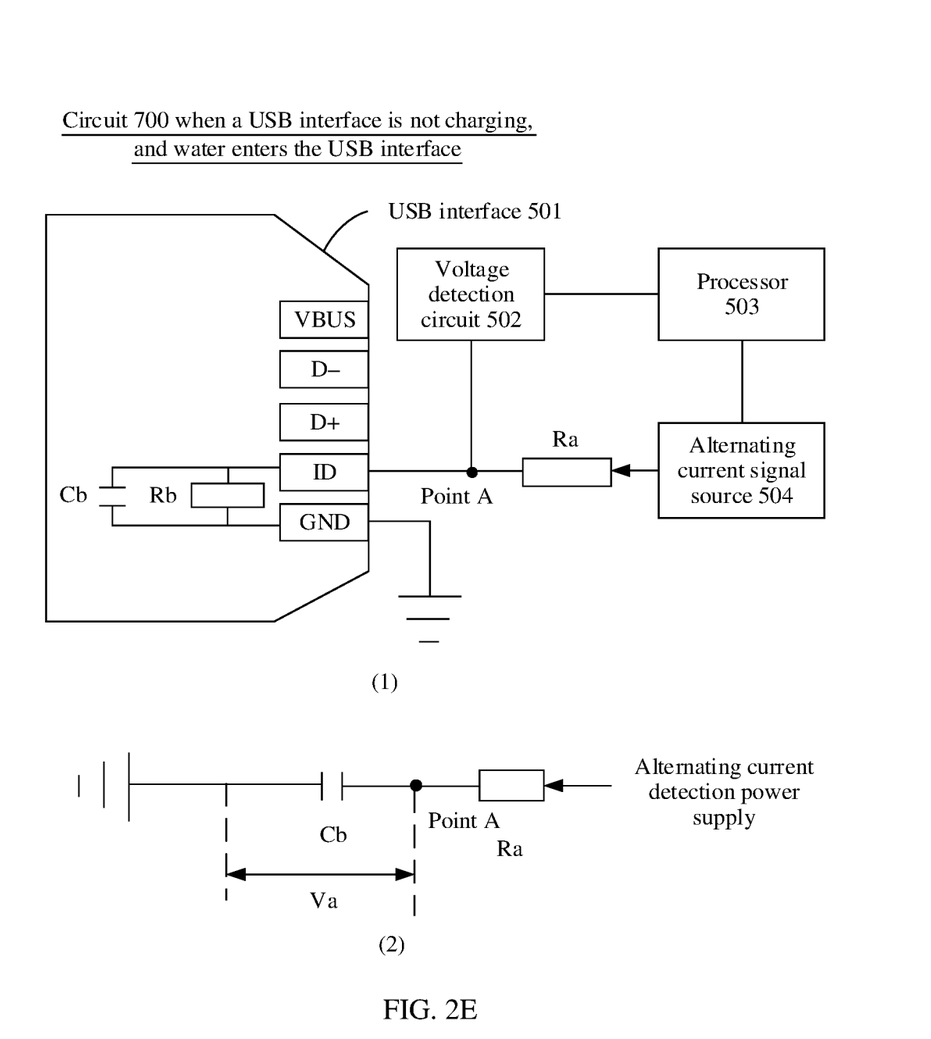
FIG. 2E is a diagram 5 of a circuit for detecting whether water enters a USB interface according to an embodiment of this application.

FIG. 2E (i) is a circuit 700 formed after water enters the USB interface when the USB interface is in a non-charging state. In the circuit 700, an equivalent resistor Rb and an equivalent capacitor Cc are formed by water between the ID pin and the GND pin.

If water entering the USB interface has a relatively strong conductivity, a resistance value of the equivalent resistor Rb is very small, and is far less than that of the resistor Ra. In this case, a voltage value on the ID pin is also extremely small, and a peak-to-peak value is also extremely small.

If water entering the USB interface has a relatively weak conductivity, a resistance value of the equivalent resistor Rb may be considered as infinite, and then an alternating current detection power supply is equivalent to being grounded by using the resistor Ra and capacitor Cb, as shown in a circuit shown in FIG. 2E (2). In other words, the resistor Ra and the capacitor Cb form a low-pass filter. For a function of the low-pass filter, refer to the foregoing related descriptions. Details are not described herein again. A frequency of the alternating current signal output by the alternating current signal source 504 may be controlled, and then whether water enters the USB interface is determined by detecting a change of the peak-to-peak value of the voltage value on the ID pin.

It should further be noted that a position relationship between the power supply pin, the ground pin, and the pin (namely, the first pin) configured to detect the peak-peak value of the voltage in the USB interface in the foregoing circuit diagram is merely an example. In other words, the position relationship between the three pins in the USB interface is not limited in this embodiment of this application. After water enters the USB interface, as long as a circuit connection relationship that is formed between these pins due to water ingress and that is the same as or similar to the circuit relationship in this application, the position relationship between the three pins in the USB interface is applicable to the detection method provided in the embodiments of this application.

In conclusion, this embodiment of this application provides the water ingress detection method of the electronic device. The pin in the electrical interface of the electronic device that needs to be detected can be connected by controlling to input an alternating current signal with a frequency within a specific range and an internal resistance of the alternating current signal. A voltage value of the pin in the electrical interface is detected. If the peak-to-peak value of the voltage value of the electrical interface pin is less than a specific threshold, it is considered that water enters the electronic device. In this embodiment of this application, when the electrical interface of the electronic device is in a charging state, whether water enters the electronic device can also be accurately detected. In addition, when a small amount of water enters the electrical interface of the electronic device, that water enters the electrical interface of the electronic device may also be detected. It can be learned that the detection method provided in this embodiment of this application can improve accuracy of detecting water ingress of the electronic device.

In addition, costs of components used in the resistor, the alternating current power supply, and the ADC in the method provided in the embodiments of this application are relatively low.

In some embodiments, in addition to determining whether water enters the USB interface by determining whether the peak-to-peak value of the voltage value on the ID pin is less than the threshold, that is, determining whether water enters the USB interface by using a change of the peak-to-peak value of the voltage after the alternating current detection signal passes through the low-pass filter formed by the internal resistor Ra and the equivalent capacitor formed by the water in the USB interface, whether water enters the USB interface is further determined by using another change after the alternating current detection signal passes through the low-pass filter. For example, when the alternating current detection signal is in a square wave, after an edge of the square wave passes through a low-pass filtering circuit, an edge of a signal becomes slow. Therefore, whether water enters the USB interface may also be determined by detecting whether an edge slope of the square wave signal becomes slow. This is not limited in this embodiment of this application.

In some other embodiments, in addition to using the voltage detection circuit to obtain the voltage value on the ID pin, and obtaining, by a processor, the peak-to-peak value of the voltage value on the ID pin, another method may be used to obtain the peak-to-peak value. For example, this may also be implemented by using a hardware circuit. For example, after an input alternating current detection signal is input into the foregoing low-pass filter, the input alternating current detection signal is sent to a direct current blocking circuit to isolate a direct current component, and then the input alternating current detection signal passes through a peak detection circuit to detect an alternating current peak value. The peak detection circuit outputs the peak-to-peak value to a comparator, and the comparator compares the peak-to-peak value with a preset threshold, to output a detection result. This is not limited in this embodiment of this application.

Figure 3:
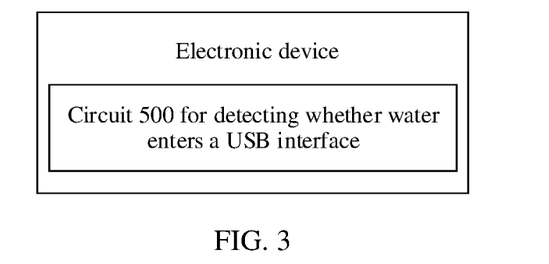
FIG. 3 is a schematic structural diagram of an electronic device according to an embodiment of this application.

FIG. 3 is a block diagram of an electronic device. As shown in FIG. 3, the electronic device may include a circuit for detecting whether water enters a USB interface shown in FIG. 2A. The electronic device has a same function as that of detecting whether water enters the USB interface shown in FIG. 2A. Details are not described again. The electronic device may further include a circuit that detects, by using a same method of the circuit as shown in FIG. 2A, whether water enters another electrical interface or component of the electronic device. This is not limited in this embodiment of this application.

For example, the electronic device in this application may be a mobile phone, a tablet computer, a personal computer (PC), a personal digital assistant (PDA), a smartwatch, a netbook, a wearable electronic device, an augmented reality (AR) device, a virtual reality (VR) device, an in-vehicle device, a smart automobile, a smart speaker, a robot, and the like. A specific form of the electronic device is not particularly limited in this application.

It should be noted that a structure of the device shown in FIG. 3 does not constitute a limitation on the terminal device. The terminal device may include more or fewer components than those shown in the figure, or combine some components, or have different component arrangements. Although not shown, the terminal device may further include a display, a battery, a camera, a Bluetooth module, a global positioning system (GPS) module, and the like. Details are not described herein.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
   outputting, by an alternating current signal source of an electronic device, an alternating current detection signal, wherein the electronic device comprises a first electrical interface, a resistor circuit, and the alternating current signal source, wherein one end of the resistor circuit is electrically connected to a first pin of the first electrical interface, and another end of the resistor circuit is directly electrically connected to the alternating current signal source using an electrical communication path in a manner that the alternating current detection signal is directly input to the resistor circuit, and no other electrical component is electrically connected on the electrical communication path between the another end of the resistor circuit and the alternating current signal source, and wherein a ground pin of the first electrical interface is grounded when the first electrical interface is in operation;
   detecting, by the electronic device, a maximum voltage value and a minimum voltage value on the first pin within a period of the alternating current detection signal; and
   in response to determining a difference between the maximum voltage value and the minimum voltage value to be less than a first threshold, determining, by the electronic device, that water has entered the first electrical interface.

2. The method according to claim 1, wherein a total resistance value of the resistor circuit is greater than 100 kilo ohms, and a frequency of the alternating current detection signal is between 10 Hz and 50 Hz.

3. The method according to claim 2, wherein outputting, by the alternating current signal source of the electronic device, the alternating current detection signal comprises:

in response to detecting that the first electrical interface is in a charging state, controlling, by the electronic device, the alternating current signal source to output the alternating current detection signal; or in response to a detecting an operation of enabling a detection function by a user, controlling, by the electronic device, the alternating current signal source to output the alternating current detection signal; or in response to detecting that the electronic device is in a power-on state, controlling, by the electronic device, the alternating current signal source to output the alternating current detection signal.

4. The method according to claim 1, wherein outputting, by the alternating current signal source of the electronic device, the alternating current detection signal comprises:

in response to detecting that the first electrical interface is in a charging state, controlling, by the electronic device, the alternating current signal source to output the alternating current detection signal; or in response to a detecting an operation of enabling a detection function by a user, controlling, by the electronic device, the alternating current signal source to output the alternating current detection signal; or in response to detecting that the electronic device is in a power-on state, controlling, by the electronic device, the alternating current signal source to output the alternating current detection signal.

5. A circuit, comprising:
a first electrical interface, wherein the first electrical interface comprises:
  a ground pin, configured to be grounded when the first electrical interface is in operation; and
  a first pin;
a resistor circuit, wherein one end of the resistor circuit is electrically connected to the first pin;
an alternating current signal source directly electrically connected to another end of the resistor circuit using an electrical communication path, the alternating current signal source being configured to generate an alternating current detection signal that is directly input to the resistor circuit using the electrical communication path, and wherein no other electrical component is electrically connected on the electrical communication path between the another end of the resistor circuit and the alternating current signal source;
a voltage detection circuit connected to the first pin, the voltage detection circuit being configured to detect a maximum voltage value and a minimum voltage value on the first pin within a period of the alternating current detection signal; and
a controller separately connected to the alternating current signal source and the voltage detection circuit, the controller being configured to control the alternating current signal source to generate the alternating current detection signal, and in response to a difference between the maximum voltage value and the minimum voltage value being less than a first threshold, determine that water has entered the first electrical interface.

6. The circuit according to claim 5, wherein the first electrical interface further comprises a power supply pin, configured to connect to a working power supply when the first electrical interface is in operation.

7. The circuit according to claim 6, wherein the first electrical interface is a universal serial bus (USB) interface.

8. The circuit according to claim 7, wherein the first pin is an ID pin.

9. The circuit according to claim 5, wherein the first electrical interface is a universal serial bus (USB) interface.

10. The circuit according to claim 9, wherein the first pin is an ID pin.

11. The circuit according to claim 5, wherein the voltage detection circuit comprises an analog-to-digital converter.

12. The circuit according to claim 5, wherein the controller comprises a processor.

13. An electronic device, wherein the electronic device comprises the circuit according to claim 5.

14. An electronic device, comprising:
a processor;
a memory;
a first electrical interface;
a resistor circuit; and
an alternating current signal source;
wherein one end of the resistor circuit is electrically connected to a first pin of the first electrical interface, and another end of the resistor circuit is directly electrically connected to the alternating current signal source using an electrical communication path in a manner that an alternating current detection signal from the alternating current signal source is directly input to the resistor circuit, and no other electrical component is electrically connected on the electrical communication path between the another end of the resistor circuit and the alternating current signal source, and wherein a ground pin of the first electrical interface is grounded when the first electrical interface is in operation, the alternating current signal source is connected to the processor, the processor is coupled to the memory, the memory is configured to store computer program code, the computer program code comprises a computer instruction, and when the processor reads and executes the computer instruction, the electronic device is caused to:
  output, by the alternating current signal source, the alternating current detection signal;
  detect a maximum voltage value and a minimum voltage value on the first pin within a period of the alternating current detection signal; and
  in response to determining a difference between the maximum voltage value and the minimum voltage value to be less than a first threshold, determine that water has entered the first electrical interface.

15. The electronic device according to claim 14, wherein a total resistance value of the resistance circuit is greater than 100 kilo ohms, and a frequency of the alternating current detection signal is between 10 Hz and 50 Hz.

16. The electronic device according to claim 14, wherein outputting the alternating current detection signal comprises:
in response to detecting that the first electrical interface is in a charging state, controlling the alternating current signal source to output the alternating current detection signal.

17. The electronic device according to claim 14, wherein outputting the alternating current detection signal comprises:
in response to a detecting an operation of enabling a detection function by a user, controlling the alternating current signal source to output the alternating current detection signal.

18. The electronic device according to claim 14, wherein outputting the alternating current detection signal comprises:

in response to detecting that the electronic device is in a power-on state, controlling, by the electronic device, the alternating current signal source to output the alternating current detection signal.

\* \* \* \* \*